United States Patent
Prasad et al.

(10) Patent No.: US 7,639,758 B2
(45) Date of Patent: Dec. 29, 2009

(54) BLIND DETECTION OF BPSK SIGNALS IN A MULTI-USER ENVIRONMENT

(76) Inventors: Surendra Prasad, Dept. of Electrical Engineering, Indian Institute Of Technology, Delhi, Hauz Khas, New Delhi 110 016 (IN); Adbul Karim Al-Bayati, Dept. of Electrical Engineering, Indian Institute of Technology, Delhi, Hauz Khas, New Delhi 110 016 (IN); Shankar Prakriva, Dept. of Electrical Engineering, Indian Institute of Technology, Delhi, Hauz Khas, New Delhi 110 016 (IN)

(*) Notice: Subject to any disclaimer, the term of this patent is extended or adjusted under 35 U.S.C. 154(b) by 676 days.

(21) Appl. No.: 10/515,573

(22) PCT Filed: May 23, 2003

(86) PCT No.: PCT/IB03/01986

§ 371 (c)(1),
(2), (4) Date: Nov. 21, 2005

(87) PCT Pub. No.: WO2004/047390

PCT Pub. Date: Jun. 3, 2004

(65) Prior Publication Data

US 2006/0093071 A1    May 4, 2006

(30) Foreign Application Priority Data

May 23, 2002    (IN)    .......................... 582/DEL/2002

(51) Int. Cl.
*H04L 27/22*    (2006.01)

(52) U.S. Cl. ....................... 375/329; 375/140; 375/147; 375/148; 375/340; 375/349

(58) Field of Classification Search ...................... None
See application file for complete search history.

(56) References Cited

U.S. PATENT DOCUMENTS 7,088,671 B1 * 8/2006 Monsen ...................... 370/203

OTHER PUBLICATIONS

Shankar Prakriya et al (hereinafter Shankar) "Blind Space-Time Constrained Minimum Variance Detection of DS/CDMA Signals" IEEE Apr. 28-May 2, 2002.*

(Continued)

*Primary Examiner*—Mohammad H Ghayour
*Assistant Examiner*—Leon Flores
(74) *Attorney, Agent, or Firm*—Ladas & Parry LLP (57) ABSTRACT

The present invention relates to a system and method for the blind detection of BPSK signals in a multi-user environment. More particularly, the present invention provides a system and a method for blind detection of BPSK signals in an environment with multiple simultaneous transmitters. The received signal is a composite signal consisting of several delayed phase shifted and attenuated versions of the desired signal with other such signals from other transmitters. The present invention also provides a system for blind (without using training sequences) detection of BPSK signals in a multi-user environment. In particular, the system of the invention is of utility in the CDMA environment.

9 Claims, 5 Drawing Sheets

OTHER PUBLICATIONS

Al-Bayati, et al. "Block Phase-Precording for Blind Multiuser Detection of BPSK/DS-CDMA Signals" *IEEE International Conference on Personal Wireless Communications* (2002) pp. 250-254.

Al-Bayati, et al. "Block Modulus Precoding for Blind Multiuser Detection of DS-CDMA Signals" *IEEE Transactions on Communications* (2003) vol. 51, No. 1, pp. 52-56.

Al-Bayati, et al. "Block Spectral Precoding for Blind Multiuser Detection of DS/CDMA Signals" IEEE International Conference on Personal Wireless Communications (2002) pp. 238-242.

Sripimanwat, K., et al. "Improved Performance Analysis of Spiral Curve-Phase Precoding" *Electronics Letters* (2000) vol. 36, No. 8, pp. 729-730.

Chan, Y., et al. "Channel Precoding for Indoor Radio Communications Using Dimension Partitioning" *IEEE Transactions on Vehicular Technology* (1999) vol. 48, No. 1, pp. 98-114.

Zhuang, W., et al. "Nonlinear Phase Precoding for Personal Communications" *Electronics Letters* (1994) vol. 30, No. 24, pp. 2010-2011.

* cited by examiner

BLIND DETECTION OF BPSK SIGNALS IN A MULTI-USER ENVIRONMENT

FIELD OF INVENTION

The present invention relates to a system and method for the blind detection of BPSK signals in a multi-user environment. More particularly, the present invention provides a system and a method for blind detection of BPSK signals in an environment with multiple simultaneous transmitters. The received signal is a composite signal consisting of several delayed phase shifted and attenuated versions of the desired signal with other such signals from other transmitters. The present invention also provides a system for blind (without using training sequences) detection of BPSK signals in a multiuser environment. In particular, the system of the invention is of utility in the CDMA environment.

The present invention relates to the field of Multiuser Communication using DS/CDMA technology. A system and method for blind multiuser (MU) detection of BPSK/DS-CDMA signals has been disclosed.

BACKGROUND OF THE INVENTION

The field of multiple access communications using the DS/CDMA signals is well known in the art. This technique permits multiple users (subscribers) to share the same spectral band by assigning different spreading codes to different users. Each spreading code spreads the bandwidth of the data signals by multiplication of the latter with the binary elements of a code sequence at a higher rate, called the chip-rate. Several well-known and often used spreading codes include the Gold codes, the Kasami sequences etc. in view of their excellent auto- and cross-correlation properties. In a multiuser receiver, such as the one at a base station in a wireless communication scenario, different users can be separated from each other in the code space by using appropriate signal processing techniques. In fact, one of the key problems faced by the receiver is that of removing the unwanted interference from other users. Several multiuser receiver structures have been developed which make use of the knowledge of the spreading codes of the various users. Some of the well known receiver structures include the simple matched filter receiver, the so-called "decorrelating" receiver, the minimum mean square error receiver and the minimum output energy receiver among others. Many of these solutions assume that the transmission medium is clean subject only to additive white Gassuian noise (viz., the AWGN channel). Actual wireless communication media are seldom of this nature due to rather severe multi path that results from various reflecting objects.

The main effect of the multi path nature of the communication channel is that, since the same transmitted signal is received through different, unknown paths with different delays and path strengths, the effective spreading codes associated with different users undergo unknown changes, and are thus unknown at the receiver. This makes separation of the desired signals from others rather difficult. Some methods exist which attempt to first estimate the multipath channel to ascertain its effect on the spreading codes and separate the various signals on the basis of estimated effective codes. These methods require probing of the channel via specially transmitted training sequences, which have an adverse effect on the throughput rate of the system.

In a DS-CDMA system, the data to be transmitted is modulated by a chip-code, which is unique to each user. The chip code is reasonably large, so that there are typically a large number of chips in one symbol duration. Clearly, the bandwidth of the signal is increased by the modulation. The chip is assumed to have a periodicity of one symbol duration, though this invention can be applied to cases when the periodicity is larger. Several users transmit simultaneously, so that the receiver has to make use of the unique chip code to separate the desired user's symbols. When the chip codes are orthogonal to each other, interference from other users is eliminated completely under ideal conditions (no channel distortions) as is well known. Since the number of users is typically large, the chip codes are not orthogonal to each other. In any case, channel distortions cause the effective chip code to be different, thereby destroying the orthogonality of the chip codes.

Optimum multiuser detectors [1] are difficult to implement because of their high complexity. Also, they require a lot of information—the effective chip codes code (changed by the channel) of all users.

The many parameters required by the optimal multiuser detector are difficult to reliably estimate in fast changing multipath scenario of typical CDMA links. Training sequences (known to the receiver apriori) can be used to assist the receiver in estimation of the desired chip codes. However, they consume a lot of bandwidth since these sequences need to be sent periodically when the channel is changing. Development of techniques that can estimate the channel/symbols in a blind manner (without training sequences) is thus of considerable practical interest. The proposed invention achieves just that, and among other things, does away with the need to estimate the effective codes (of even the desired user).

Although some methods of precoding at-the transmitter have been proposed in the art these all pertain to channel estimation. Also these methods typically rely on prior FIR filtering/encoding of the data, and are therefore unable to separate the different signals effectively. These methods also sacrifice data rate or system bandwidth in the process.

OBJECTS OF THE INVENTION

The main object of the present invention is to modify a transmitter in a multi-user environment such as a CDMA environment such that the desired user's symbols can be detected one symbol at time at the receiver
a) without estimation of the channel distortion
b) without knowledge of the codes of any user (not even that of the desired user), and
c) without sacrificing data rate or system bandwidth.

SUMMARY OF THE INVENTION

Accordingly, the present invention provides a particular type of pre-coding of the transmitted binary symbols that helps the receiver contend with a) self-interference from copies of the desired signal itself, and b) signals of other users possibly having larger powers). The system of the invention has significant advantages over conventional systems.

The system of the invention achieves blind detection by pre-coding the transmitted data. Each user has a unique pre-coding sequence, that is, for example a PRBS sequence. The data to be transmitted is multiplied by each transmitter (at the bit rate) by the pre-coding sequence that consists of 1 and j ($\sqrt{-1}$). This means that predetermined bits are multiplied by j, making some of the transmitted symbols of all users complex. At the receiver, the received signal is chip match filtered and sampled to obtain a sequence which contains samples of the signals transmitted by each transmitter as well as their delayed phase shifted and attenuated versions. The receiver multiplies the received signal by inverse of the desired user's pre-coding sequence. The received signal still consists of sum of several signals, but the signal of the desired user has the unique property that its symbols are now real, while that of others is complex. Note that the Inter-Symbol Interference (ISI or self-interference) component of the desired signal also has complex symbols after multiplication by inverse of the pre-coding sequence of the desired user at the receiver. The receiver then needs to simply estimate the real data symbols from a mixture of signals with complex symbols. This can be achieved by any technique, and the linear zero-forcing receiver is one such possible implementation.

Comparable systems proposed to-date require knowledge of the effective chip code of at least the desired user. For example constrained optimization techniques like the Minimum Output Energy (MOE) [2] require received samples accumulated over a large number of symbols, and perform poorly in heavily loaded systems with a large number of active users. Methods that exploit the subspace structure [3] are computationally complex. Methods that exploit the constant modulus property of the transmitted BPSK are plagued by convergence problems.

In this invention, a linear receiver is estimated. Great advantages are accrued because of the modifications introduced in this invention, prominent among them being:
1. There is no need to estimate the channel, which implies that no training sequences or complex algorithms are required.
2. Knowledge of the codes of the even the desired user is not required.
3. The receiver is unaffected by power of the interference (no near-far problem).
4. The receiver can work with short data records since statistics of the received sequence are not used. This implies that the proposed system can perform well even in rapidly changing channels.
5. The receiver is symbol-by-symbol type.
6. Complexity of the receiver is low.

DETAILED DESCRIPTION OF THE PREFERRED EMBODIMENTS

The present invention relates to a System and Methods of blind multi-user (MU) detection of BPSKIDS-CDMA signals by means of precoding uniquely for each user, the phase of a block of transmitted data to enable separation and detection of a desired user's signals in an-unknown multi-path channel. The system does not require channel estimation and does not even need the knowledge of the desired user's code. Since there is no channel probing, the said method does not involve any sacrifice in data rate and system bandwidth.

The precoding is achieved by using a phase rotation operation of the BPSK signal at the transmitter. A corresponding decoding operation is to be carried out at the receiver for undoing the precoding of the desired signal. The system considered is a quasi synchronous, short spreading code (code period=symbol period) system with K users, and process gain of P with K≦P.

The data to be transmitted by each user is divided into blocks of N-symbols. Each user is assigned a unique pseudo random binary (+1, −1) preceding sequence of length N. Each binary symbol in data block of each user is then multiplied by a factor of either j √−1 or 1, depending on whether the corresponding bit in the preceding sequence is +1 or −1 respectively. Thus the BPSK signal of each user is converted to a QPSK-like signal.

The said preceding is accomplished by using a hardware multiplier, wherein the baseband BPSK signal is multiplied by a baseband sequence consisting of binary elements $\{1, e^{j\pi/2}\}$. Alternatively, this multiplication is effectuated either through a suitable logic circuit (realizable using logic gates) or through suitable instructions given to a DSP chip.

At the receiver, the said System makes use of this preceding to detect the desired user by means of a zero-forcing detector. This zero forcing detector is based on compution of a weight which is obtained as a singular vector of a suitably formulated material from the observations.

In the present invention the first stage of the receiver consists of an inverse operator to undo the precoding on the desired signal, while the signals from other users retain their QPSK like structure irrespective of the channel. This is followed by a correlator like detector, which produces a zero response for the interfering QPSK signals while producing a fixed response for the desired BPSK signal. As a result, interference from all other users is effectively nulled out. The receiver can be easily realized in the form of instructions on a DSP processor or a suitably designed FPGA (field programmable gate array) device or ASIC.

Description of the proposed invention is provided for the specific case of synchronous DS-CDMA systems where the multipath spread does not exceed a few chip intervals, It is emphasized that the proposed invention can also be applied to asynchronous systems with minor modifications as discussed in [4].

After down conversion, the received signal is chip matched filtered and sampled at the chip rate to give:

$$Y(i, p) = x(i, p) + n(i, p) \quad (1)$$

where y(I, p) denotes the $p^{th}$ sample in the $i^{th}$ symbol interval and $$x(i, p) = \sum_{k=1}^{k} S_{k(i)} \sum_{l=1}^{L} a_{l,k} C_{k,l}(p)$$

where $a_{l,k}$ denotes the complex gain of the $l^{th}$—path of the $k^{th}$—user channel, $c_{k,l}(p)$ denotes the $p^{th}$—chip of the $k^{th}$—user's code arriving through the $l^{th}$—path, taking into consideration the code delay in that path and the chip pulse shape used. The $k^{th}$ user symbol in the $i^{th}$ symbol interval is denoted by $_{Sk}(i)$, and n(i,p) is a complex valued Additive White Gaussian Noise (AWGN) sample, of zero mean and variance $\alpha^2$, in the $i^{th}$ symbol interval at the $p^{th}$ chip sample. P represents the processing gain. We construct the signal matrix for the samples received in an N-symbol block interval as $$Y = \begin{pmatrix} y(1,1) & y(1,2) & \ldots & y(1,P) \\ y(2,1) & y(2,2) & \ldots & y(2,P) \\ \vdots & & & \vdots \\ y(N,1) & \ldots & \ldots & y(N.P) \end{pmatrix} = X + SH + N$$

where $$X = \begin{pmatrix} x(1,1) & x(1,2) & \ldots & x(1,P) \\ x(2,1) & x(2,2) & \ldots & x(2,P) \\ \vdots & & & \vdots \\ x(N,1) & \ldots & \ldots & x(N.P) \end{pmatrix} = X + SH + N$$

and the matrix N denotes the matrix of complex valued AWGN samples of zero mean and variance $\alpha^2$, $S=[s_1 \, s_2 \ldots s_k]$ is the matrix of data vectors from all users, where $s_k=[s_k(1) \, s_k(2) \ldots s_k(N)]^T$ is the data of user k. The matrix $H=[h_1 \, h_2 \ldots h]^T$ represents the matrix of effective chip codes (i.e., the code vectors as seen at the output of the multi path channel). The $k^{th}$ user's effective code vector (also called the effective signature vector), is given by $h_k = c_k g_k$ where $c_k = [c_{k,1} \, c_{k,2} \ldots c_{k,1}]$, is the spreading code-matrix of the $k^{th}$ user as seen from the L-paths of its arrival, the vector $C_{k,1} \stackrel{\Delta}{=} [C_{k,1}(1) \, C_{k,1}(2) \ldots C_{k,1}(P)]^T$ denotes the code vector of the $L^{th}$ path of the $k^{th}$ user, and $g_k = [a_{1,k} \, a_{2,k} \ldots a_{L,K}]^T$ denotes the vector of complex coefficients associated with the L paths of the $K^{th}$ user.

A linear receiver $w_k$ estimates the symbol vector $S_k$ of user k as. $Y_{wk}$. The problem is to estimate a linear receiver without requiring any knowledge of the codes and the distortion caused by the channel. Since precoding has been used in the transmitter, we first perform an inverse operation at the receiver before stacking samples of the chip match filtered waveform.

Stacking the samples as before results in $Y_k$ given by:

$$Y_k \stackrel{\Delta}{=} S'H + D_k^{-1} N$$

where $$S' = [s_{1,k} s_{2,k} \ldots s_{k-1,k} s_k s_{k+1,k} s_{K,k}]$$

Here $s_{i,k}$ denotes the symbols of user i modified by the inverse precoding sequence of user k. It can be seen easily that only $S_k$ (symbol vector of the desired user) is real, and the symbols of the other users are not all real because the inverse precoding sequence of user k does not invert the precoding of other users.

The problem of estimation of a real symbol vector from a mixture consisting of only one real symbol vector and complex symbol vectors can be solved in a variety of ways. As noted earlier, we focus on linear receivers in this description. One can obtain the coefficients of the linear receiver by a simple quadratic minimization. We define $$v \stackrel{\Delta}{=} \left( w_{(r)}^T \, w_{(r)}^T \right)^T$$

where the notation (r) and (i) has been used to indicate the real and imaginary parts of the indexed parameters. Similarly we define:

$$A = [Y_{k(i)} \, Y_{k(r)}]$$

$$B = [Y_{k(r)} \, Y_{k(i)}]$$

where $Y_{k(i)}$ and $Y_{k(r)}$ denote the imaginary and real part of $Y_k$. It can be shown [4] that the linear receiver coefficients can be obtained as a solution to the following constrained minimization:

minimize: $v^T A^T A v$ subject to $v^T B^T B v = N$

This minimization can be achieved using iterative or adaptive techniques. A one shot solution can be found as the generalized eigenvector associated with the minimum eigenvalue of the matrix pair $(A^T, A, B^T B)$, and obviously w is given as $W = v_2 + j v_2$ where $$v_1 = \begin{pmatrix} v(1) \\ \vdots \\ v(P) \end{pmatrix}$$

and $$v_2 = \begin{pmatrix} v(P+1) \\ \vdots \\ v(2P) \end{pmatrix}$$

Figure 1:
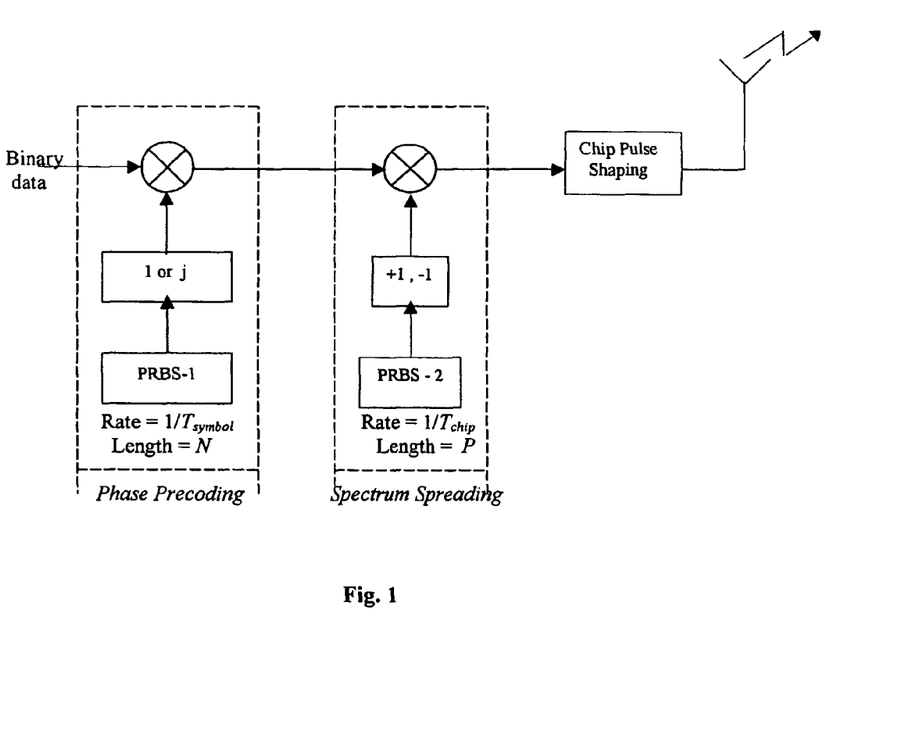
FIG. 1. Block diagram of proposed transmitter using precoding at the transmitter. Note that T symbol denotes the symbol duration, and $T_{chip}$ the chip duration.
Figure 2:
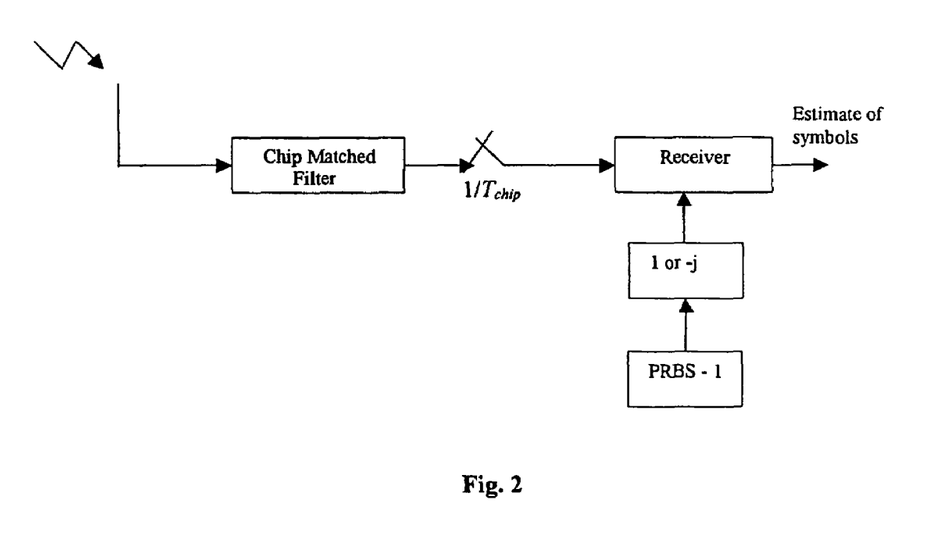
FIG. 2. Block diagram of proposed receiver that exploits precoding at transmitter, where $T_{chip}$ denotes the chip duration.
Figure 3:
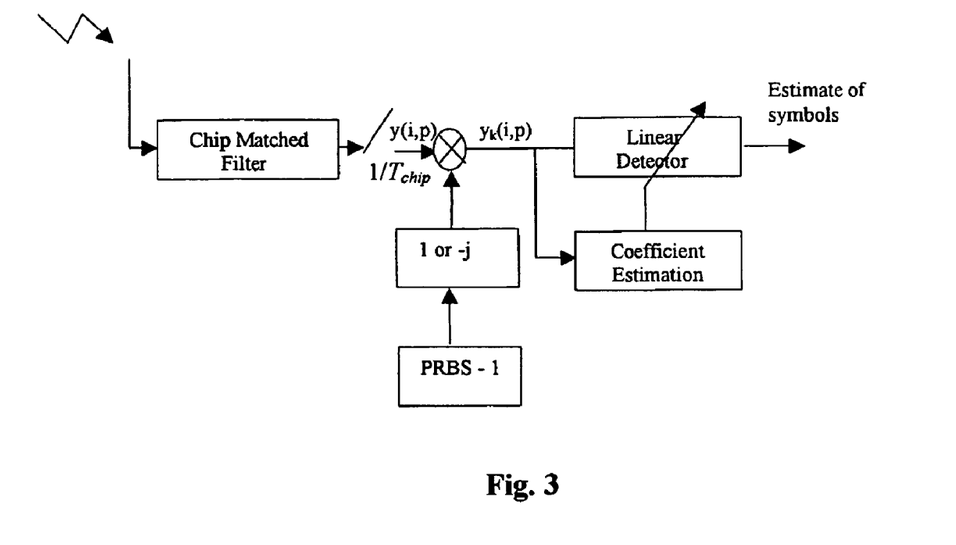
FIG. 3 is a detailed block diagram of one possible implementation in the DS-CDMA context.
Figure 4:
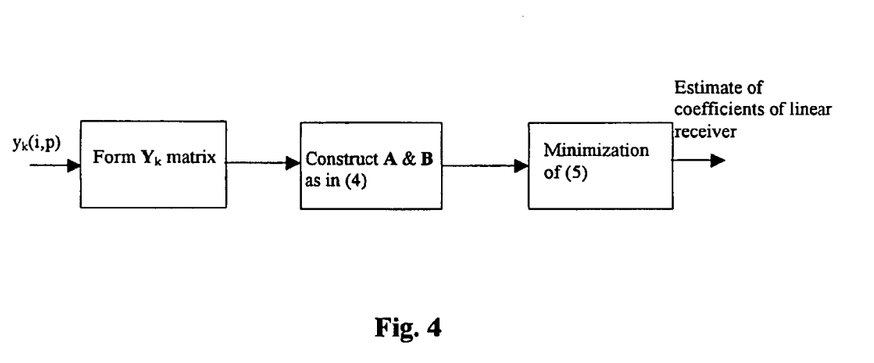
FIG. 4 is detailed block diagram of one possible implementation of the linear receiver estimation block in FIG. 3.
Figure 5:
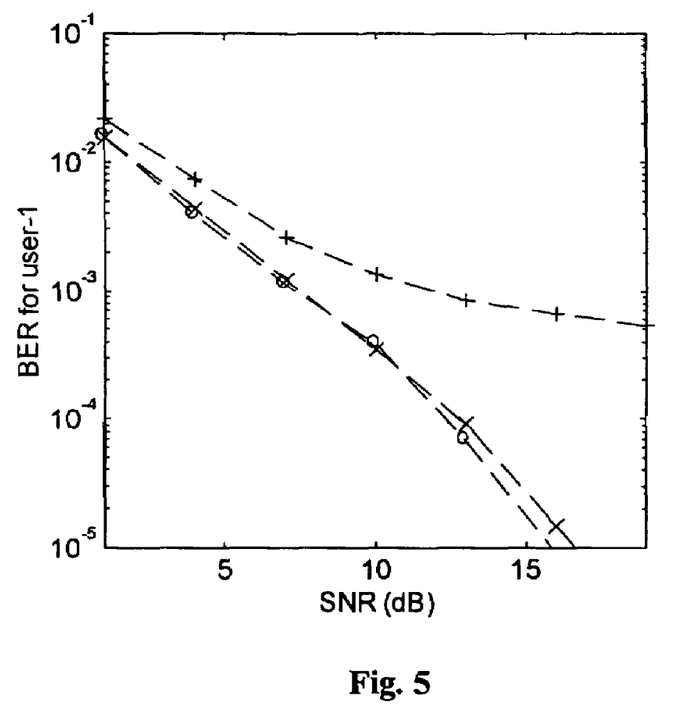
FIG. 5 Bit Error Rate (BER) performance of the weakest user versus SNR: P=20, K=10, N=200, each user is 20 dB higher in power than desired user, (000: proposed method, +++: MOE method with perfect channel knowledge [2], xxx: Blind MMSE of [3]).

A schematic diagram of the receiver is shown in FIG. 3, and one possible implementation of the linear receiver coefficients can be as depicted in FIG. 4. Performance of the proposed system is evaluated for using short-data records assuming the following parameters: P=20, K=10, N=200, each user is 20 dB higher in power than desired user (a bad near far situation). The performance is averaged over hundreds of random channels. It can be seen that the proposed system has performance that is superior to those that estimate the symbols without precoding at the transmitter. The receiver coefficients were estimated as in [2] and [3] in the latter case. Note that these require knowledge of the exact chip code or estimates of channel distortion of the desired user signal. When small number of symbols are used, the proposed system has performance that is quite superior even in a bad near-far situation, while requiring no knowledge of channel or even codes of users (not even that of the desired user). However, the precoding sequence of the desired user needs to be known.

REFERENCES

1. S. Verdu, Multiuser detection, Cambridge university press, Cambridge, 1998.
2. M. K. Tsatsanis and Z. Xu, "Performance Analysis of Minimum Variance CDMA Receivers," IEEE Trcms . . . Signal Processing, vol. 46, pp. 3014-3022, November 1998
3. X. Wang, and H. V. Poor, "Blind Multiuser Detection: A Subsace Approach," IEEE Trans; Inform. Theory, vol. 44, pp: 677-691, March 1998.
4. AK. S. Al-Bayati, Shankar Prakriya, and. Surendra Prasad, "BIQCk Phase Precoding for Blind Multiuser Detection of BPSK/DS-CDMA Signals," IEEE International Conference on Personal Wireless Communication (ICPWC-2002), New Delhi 2002.

The invention claimed is:

1. A method for a blind detection of BPSK signals in a multi-user environment with multiple simultaneous transmitters, comprising:
   precoding uniquely for each user of the BPSK symbols at a transmitter, the precoding being achieved by using a phase rotation of the BPSK symbols at the transmitter for detection of a desired user's signals in an unknown multi-path channel, dividing data to be transmitted by each user into blocks of N-symbols, assigning to each user a unique random binary (+1, −1) precoding sequence of length N, multiplying each binary symbol in the data block of each user by a factor of either $j=\sqrt{-1}$ or 1 depending upon whether the corresponding bit in the precoding sequence is +1 or −1, thereby obtaining a QPSK-like signal, multiplying by an inverse of the user's precoding sequence at a receiver to detect the desired user's signal, and detecting at the receiver the precoded symbols of the desired user by forcing a zero response for interfering signals while producing a fixed or large response for the desired signal based on the desired user's symbols being real and the symbols of the interference being complex.

2. A method as claimed in claim 1, wherein the signals received at the receiver is chip matched filtered and sampled at the chip rate to give:

$$Y(i, p) = x(i, p) + n(i, p) \quad (1)$$

where y (i, p) denotes the $p^{th}$ sample in the $i^{th}$ symbol interval and $$x(i, p) = \sum_{k=1}^{k} S_{k(i)} \sum_{l=1}^{L} a_{l,k} C_{k,l}(p)$$

where $a_{l,k}$ denotes the complex gain of the $l^{th}$-path of the $k^{th}$-user channel; $c_{k,l}(p)$ denotes the $p^{th}$-chip of the $k^{th}$-user's code arriving through the $l^{th}$-path, taking into consideration the code delay in that path and the chip pulse shape used, $s_k(i)$ denotes the $k^{th}$ user symbol in the $i^{th}$ symbol interval, and n (i,p) is a complex valued Additive White Gaussian Noise (AWGN) sample, of zero mean and variance $o^2$, in the $i^{th}$ symbol interval at the $p^{th}$ chip sample, P represents the processing gain.

3. A method as claimed in claim 2, wherein a signal matrix for the samples received in an N-symbol block interval is constructed as $$Y = \begin{pmatrix} y(1,1) & y(1,2) & \ldots & y(1,P) \\ y(2,1) & y(2,2) & \ldots & y(2,P) \\ \vdots & & & \vdots \\ y(N,1) & \ldots & \ldots & y(N.P) \end{pmatrix} = X + SH + N$$

where $$X = \begin{pmatrix} x(1,1) & x(1,2) & \ldots & x(1,P) \\ x(2,1) & x(2,2) & \ldots & x(2,P) \\ \vdots & & & \vdots \\ x(N,1) & \ldots & \ldots & x(N.P) \end{pmatrix} = X + SH + N$$

and the matrix N denotes the matrix of complex valued AWGN samples of zero mean and variance $\alpha^2$, $S=[s_1 \, s_2 \ldots s_k]$ is the matrix of data vectors from all users, where $s_k=[s_k(1) \, s_k(2) \ldots s_k(N)]^T$ is the data of user k, and the matrix $H=[h_1 \, h_2 \ldots h]^T$ represents the matrix of effective chip codes (or the code vectors as seen at the output of the multi path channel).

4. A method as claimed in claim 3, wherein the $k^{th}$ user's effective code or signature vector is given by $h_k = C_k g_k$ where $C_k = [C_{k.1} \, C_{k.2} \ldots C_{k.l}]$ is the spreading code-matrix of the $k^{th}$ user as seen from the L-paths of its arrival, the vector $C_{k.1} \stackrel{\Delta}{=} [C_{k.1}(1) \, C_{k.1}(2) \ldots C_{k.1}(P)]^T$ denotes the code vector of the $L^{th}$ path of the $k^{th}$ user, and $g_k = [a_{1.k} \, a_{2.k} \ldots a_{L.K}]^T$ denotes the vector of complex coefficients associated with the L paths of the $K^{th}$ user.

5. A method as claimed in claim 1, wherein an inverse operation is performed at the receiver and thereafter stacking the samples of chip matched filtered signals.

6. A method as claimed in claim 1, wherein after application of the inverse precoding operation, the component of the interference at the output of a linear receiver is forced to zero or minimized, and the component of the desired user's signal is maximized or fixed to a value, the minimization and maximization being achieved by a batch mode method using exact or iterative techniques.

7. A method as claimed in claim 1, wherein a multipath spread is larger than a few chips and the multi-user system is asynchronous, so that $Y_k$ matrix is constructed by stacking samples of adjacent symbols into matrices with N rows and mP columns so that the detector size is mP for integer m.

8. A method as claimed in claim 1, wherein the method is applied in a Direct Sequence Spread Spectrum (DS)-CDMA system.

9. A method for a blind detection of BPSK signals in a multi-user environment with multiple simultaneous transmitters, comprising:

precoding uniquely for each user of the BPSK symbols at a transmitter, the precoding being achieved by using a phase rotation of the BPSK symbols at the transmitter for detection of a desired user's signals in an unknown multi-path channel, dividing data to be transmitted by each user into blocks of N-symbols, assigning to each user, a unique random binary (+1, −1) precoding sequence of length N, multiplying each binary symbol in the data block of each user by a factor of either $j=\sqrt{-1}$ or 1 depending upon whether the corresponding bit in the precoding sequence is +1 or −1, thereby obtaining a QPSK-like signal, multiplying by an inverse of the user's precoding sequence at the receiver to detect the desired user's signal, and, detecting at the receiver the precoded symbols of the desired user by forcing a zero response for interfering signals while producing a fixed or large response for the desired signal based on the desired user's symbols being real and the symbols of the interference being complex, wherein an inverse operation is performed at the receiver and thereafter stacking the samples of chip matched filtered signals, and wherein said stacking of received samples after chip match filtering and user of inverse precoding of user k at the receiver results in a matrix $Y_k$ wherein the matrix is a mixture of real symbol vector and complex symbol vectors, wherein $$Y_k = \Delta S'H + D_k^{-1} N$$

wherein $$S' = [S_{1,k} \, S_{2,k} \ldots S_{k-1,k} \, S_k \, S_{k+1,k} \, S_{K,k}]$$

wherein $D_k^{-1}$ denotes the inverse precoding operation, and N the matrix of noise samples, K denotes the number of simultaneous transmitters in the system, $S_{i,k}$ denotes the symbol vector of user i modified by the inverse precoding sequence of user k, thus ensuring that only $S_k$, the symbol vector of the desired user, is real, and the symbols of the other users are not all real because the inverse precoding sequence of user k does not invert the precoding of other users.

* * * * *